(12) United States Patent
Chettouf et al.

(10) Patent No.: US 8,518,849 B2
(45) Date of Patent: Aug. 27, 2013

(54) PROCESS FOR HYDROCARBON SYNTHESIS

(75) Inventors: Abderrahmane Chettouf, Amsterdam (NL); Gerardus Petrus Lambertus Niesen, Amsterdam (NL); Marinus Johannes Reynhout, Amsterdam (NL); David Schaddenhorst, Amsterdam (NL)

(73) Assignee: Shell Oil Company, Houston, TX (US)

( * ) Notice: Subject to any disclaimer, the term of this patent is extended or adjusted under 35 U.S.C. 154(b) by 796 days.

(21) Appl. No.: 12/307,937

(22) PCT Filed: Jul. 9, 2007

(86) PCT No.: PCT/EP2007/056926
§ 371 (c)(1),
(2), (4) Date: Jan. 8, 2009

(87) PCT Pub. No.: WO2008/006786
PCT Pub. Date: Jan. 17, 2008

(65) Prior Publication Data
US 2009/0312179 A1    Dec. 17, 2009

(30) Foreign Application Priority Data
Jul. 10, 2006 (EP) ................................ 06116920

(51) Int. Cl.
*B01J 21/06* (2006.01)
(52) U.S. Cl.
USPC ........... 502/242; 502/350; 502/351; 502/325; 502/326

(58) Field of Classification Search
USPC .................................. 502/325, 326
IPC ................ B01J 8/00, 23/40, 23/74, 35/00
See application file for complete search history.

(56) References Cited

U.S. PATENT DOCUMENTS

| 4,595,703 A | 6/1986 | Payne et al. .................. 518/715 |
| 5,204,302 A | 4/1993 | Gorynin et al. .................... 502/2 |
| 5,620,672 A | 4/1997 | Galligan et al. ............... 423/219 |
| 2003/0119920 A1 * | 6/2003 | Wang et al. .................... 518/715 |
| 2006/0063665 A1 | 3/2006 | Baca et al. .................... 502/178 |
| 2006/0073967 A1 | 4/2006 | Wang et al. .................... 502/325 |

FOREIGN PATENT DOCUMENTS

| WO | WO9700231 | 1/1997 |
| WO | WO9814273 | 4/1998 |
| WO | WO2001012323 | 2/2001 |
| WO | WO200207872 | 1/2002 |
| WO | WO2002089978 | 11/2002 |
| WO | WO2007068731 | 6/2007 |

* cited by examiner

*Primary Examiner* — Jun Li

(57) ABSTRACT

A method of supporting a hydrocarbon synthesis catalyst material comprising a catalytically active metal and a carrier material on a metallic substrate in which the catalyst material is applied to the substrate and is heated to form a catalyst material layer fixed to the substrate with cracks having sub-millimeter widths formed in the layer creating domains with the range of the relative sizes of the domains being approximately 1:5.

16 Claims, 2 Drawing Sheets

PROCESS FOR HYDROCARBON SYNTHESIS

The present application claims priority to European Patent Application 06116920.7 filed 10 Jul. 2006.

FIELD OF THE INVENTION

The present invention relates to a method of preparing a catalyst, especially a catalyst on a support.

BACKGROUND OF THE INVENTION

The invention mainly relates to catalysts suitable in hydrogenation reactions, such as hydrogenation of hydrocarbons, e.g. hydrocracking, and hydrogenation of carbon monoxide, e.g. Fischer-Tropsch. The invention further relates to the catalysts themselves and to the use of these catalysts. The invention further relates to a process for producing normally gaseous, normally liquid and optionally solid hydrocarbons from synthesis gas, generally provided from a hydrocarbonaceous feed, for example a Fischer-Tropsch process.

Many documents are known describing processes for the catalytic conversion of (gaseous) hydrocarbonaceous feedstocks, especially methane, natural gas and/or associated gas, into liquid products, especially methanol and liquid hydrocarbons, particularly paraffinic hydrocarbons. In this respect often reference is made to remote locations and/or off-shore locations, where direct use of the gas, e.g. through a pipeline or in the form of liquefied natural gas, is not always practical. This holds even more in the case of relatively small gas production rates and/or fields. Reinjection of gas will add to the costs of oil production, and may, in the case of associated gas, result in undesired effects on the crude oil production. Burning of associated gas has become an undesired option in view of depletion of hydrocarbon sources and air pollution.

The Fischer-Tropsch process can be used for the conversion of hydrocarbonaceous feed stocks into liquid and/or solid hydrocarbons. Generally the feed stock (e.g. natural gas, associates gas and/or coal-bed methane, peat, biomass, coal) is converted in a first step into a mixture of hydrogen and carbon monoxide (this mixture is often referred to as synthesis gas or syngas). The synthesis gas is then fed into a reactor where it is converted in one or more steps over a suitable catalyst at elevated temperature and pressure into paraffinic compounds ranging from methane to high molecular weight modules comprising up to 200 carbon atoms, or, under particular circumstances, even more.

Catalysts used in the Fischer-Tropsch synthesis often comprise a carrier based support material and one or more metals from Group VIII of the Periodic Table, especially from the cobalt and iron groups, optionally in combination with one or more metal oxides and/or metals as promoters selected from zirconium, titanium, chromium, vanadium and manganese, especially manganese. Such catalysts are known in the art and have been described for example, in the specifications of WO 9700231A and U.S. Pat. No. 4,595,703.

One catalyst for Fischer-Tropsch reactions is cobalt in titania. In one method to prepare such a catalyst, cobalt hydroxide ($CO(OH)_2$) can be used as a starting material. This material impregnated onto a carrier, and then calcined to reduce to cobalt oxide (CoO); the cobalt is further oxidised ($Co_3O_4$). A calcined Fischer-Tropsch catalyst or catalyst precursor can be placed in a Fischer-Tropsch reactor. In the reactor the catalyst or catalyst precursor can be reduced. For example, cobalt oxide can be reduced to cobalt.

A suitable Fischer-Tropsch catalyst can comprise a catalytically active metal and a carrier, the carrier being 'fixed' onto a substrate. In many fixed-bed or packed bed reactors, there are several thousand elongate substrates, on which the catalyst material is supported so as to maximise possible catalyst and reactant interaction. The carrier can be 'fixed' onto one or more substrates using a ceramic 'glue'. The carrier layer is usually applied as a smooth layer. Normally the aim is to prepare a catalyst of which the carrier layer on the support remains smooth and uncracked, even during use in a reactor.

Due to the raised temperature in most hydrogenation reactors, e.g. hydrocracking reactors or hydrocarbon synthesis reactors (e.g. 200-350° C.), there is frequently tension caused by the expansion of the usually metallic substrate, and the expansion of the catalyst material, especially the catalyst carrier material which is often a ceramic material, and/or the ceramic 'glue'.

The term "catalyst material" as used herein typically refers to an active phase material, or a precursor thereof, with an inert carrier, such as a refractory oxide, present typically as nano-sized particles. The active phase material or precursor thereof may be a catalytically active metal or precursor thereof.

The tension, based on the different rates of thermal expansion, (thermal expansion coefficients), leads to erosion and attrition of the catalyst carrier, which frequently then loses its adhesion to the substrate, separates, and falls away.

It is generally considered that a smooth layer provides the best indication of the prevention of any cracking of the layer prior to use.

Thus, cracking has hitherto been considered an undesirable action, as it leads to an uncontrolled variation in the catalyst material layer. There are created many very small remaining particles of catalyst material which have insufficient strength and so catalyst material is lost due to adhesion failure caused by differences in thermal expansion between the catalyst material layer and the substrate.

This detachment clearly creates several problems. Firstly, the need to filter out any loose catalyst material or catalyst carrier from compounds formed by the reactants. Secondly, the reduced amount of catalytic activity in the hydrocarbon reactor, and thirdly, a change in the conditions around the now-bare substrate. These aspects commonly lead to the need to repair of the catalysts and of substrates in a hydrocarbon reactor. This results in reactor downtime and so reduction in the hydrocarbon conversion.

It would be an advancement in the art to provide an improved method of supporting a hydrocarbon synthesis catalyst material.

SUMMARY OF THE INVENTION

According to one aspect of the present invention, there is provided a method of supporting a hydrocarbon synthesis catalyst material comprising a catalytically active metal and a carrier material on a substrate comprising the steps of:
(a) applying the catalyst material to the substrate; and
(b) heating the catalyst material to form a catalyst material layer fixed to the substrate, characterised in that
    the catalyst carrier is a porous inorganic refractory oxide or precursor therefor;
    the catalyst material applied in step (a) comprises 60 to 90 weight % solvent calculated on the total weight of the catalyst material layer;
    when the catalyst material is subjected to the heating step (b) it comprises at most 10 weight % of solvent, calculated on the total weight of the catalyst material layer;

in heating step (b) the catalyst material is heated to a temperature in the range between 250° C. and 800° C.;

cracks having sub-millimeter widths are uniformly formed in the layer;

after step (b) the catalyst material layer has a thickness of 5-200 microns.

DETAILED DESCRIPTION OF THE INVENTION

Figure 1:
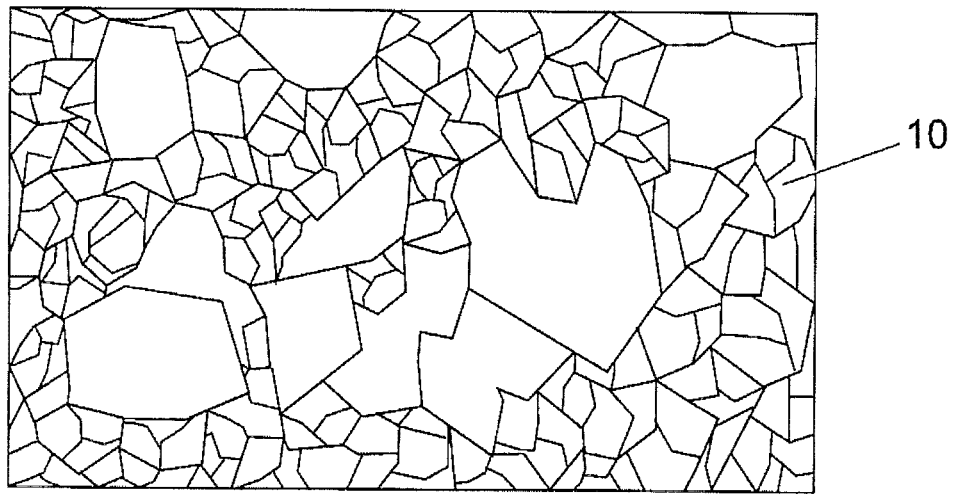
FIG. 1 is a plan schematic view of a prior art catalyst material layer on a substrate.

Preferably cracks are uniformly formed in the catalyst material layer and the layer has a less than 25%, preferably less than 20%, loss of catalyst material following the Adhesion Test described herein.

The Adhesion Test corresponds to the ASTM test method number B533-85 (2004). This is a standard test method for peel strength of metal electro-plated plastics, but is equally useable in the present situation.

The term "catalyst material" as used herein typically refers to an active phase material, or a precursor thereof, with an inert carrier, such as an inorganic refractory oxide, present typically as nano-sized particles.

When in use, the average crack width in the cracked catalyst material layer preferably is greater than the average change in length of the particles formed by the cracks in the cracked catalyst material layer.

One advantage of the present invention is that the substrate may be shaped, for example bended, after the application and calcination of the catalyst material thereon. Hence, a catalyst or catalyst precursor according to the invention may comprise a flexible and/or thin support, such as a metal wire or a thin metal plate. Such catalyst or catalyst precursor can be shaped whereby all or most of the catalyst material, preferably at least 80% of the catalyst material, will remain attached to the substrate. Catalysts comprising a thin substrate are useful as they provide a relatively large specific surface and a relatively low weight. The thickness of a metal substrate preferably is at least 5 micron, more preferably at least 10 micron. The support preferably is at most 100 micron thick.

The catalyst material can be applied directly to the substrate. Preferably, an adhesion layer is applied to the substrate as part of the step of applying the catalyst material to the substrate. More preferably, the adhesion layer is applied prior to applying the catalyst material, in the form of an 'undercoat' or 'base layer' or 'pre-coating'. The adhesion layer preferably includes a solvent, preferably a solvent being partly, substantially or wholly water. The evaporation of the solvent from the catalyst material and/or any adhesion layer provides an ability to control the cracks formed in the catalyst material layer upon its heating. The better the adhesion the more controlled the cracks will be.

Any adhesion layer, and the carrier or the catalyst material may be applied using a coating technique, for example by means of dip-coating, painting, or spray-coating.

Materials for an adhesion layer are well known in the art, and include refractory metal oxides, optionally with a sol. The precursor of the refractory oxide may be an organic salt or complex compound, in particular having up to 20 carbon atoms. Examples of such salts and complex compounds are salts, such as acetates, propionates, citrates; chelates, such as acetylacetonates, alkyl acetoacetates and chelates with lactic acid; alcoholates, such as ethylates, aminoethylates and isopropylates; and alkyl compounds, such as ethyl and isooctyl compounds. Alternatively, the precursor of the refractory oxide is an inorganic compound, such as a hydroxide; or an inorganic salt, such as a halide.

Suitable precursors of titanium dioxide are for example, tetraethyl titanate, isostearoyl titanate and octyleneglycol titanate and triethanolamine titanate. A very suitable compound, in particular for use in combination with water, is the ammonium salt of lactic acid chelated titanate. Such compounds are available from DUPONT under the trademark TYZOR. Precursors of titanium dioxide may be used in conjunction with a refractory oxide which comprises a titania.

Likewise, suitable aluminium compounds, silicon compounds, zirconium compounds may be selected for use in conjunction with refractory oxides which comprise alumina, silica or zirconia, respectively.

Optionally the adhesion layer is an amorphous layer, such as amorphous titania. Preferably such an amorphous layer will become a crystalline layer after calcination.

The carrier material preferably is an inorganic refractory oxide selected from titania, amorphous or crystalline silica, zirconia, alumina, or mixtures thereof.

Following the application of the catalyst material to the substrate, a separate heating step could be involved to assist evaporation of the solvent from any additional layer, before step (b). Where the solvent is wholly or substantially water, any such additional heating step will have a maximum of about 140-150° C., preferably below 120° C., more preferably a little way above 100° C. However, the use of water also allows evaporation of the water to occur at a reasonable expected temperature (e.g. between 20-50° C., or even lower, for example, ambient temperature or even below 0° C.) so long as there is evaporation of the solvent. Preferably solvent is allowed to evaporate until the catalyst material layer comprises at most 10 weight % of solvent, calculated on the total weight of the catalyst material layer.

Step (b) involves a higher temperature so as to fix the catalyst material to the substrate. Preferably the heating of the catalyst material at a temperature between 250° C. and 800° C., and preferably is performed during 0.5 to 5 hours, preferably 1 to 3 hours.

Typically, this temperature can be in the range between 250° C. and 600° C., where the carrier is material such as titania, but it is known in the art that this temperature range will vary according to the substrate used. For example, where the carrier material is amorphous silica, the temperature of step (b) can be in the range between 250° C. and 400° C. Where the carrier material is zirconia, the temperature of step (b) can be in the range between 250° C. and 700° C. Where the carrier material is alumina or crystalline silica, the temperature of step (b) can be in the range between 250° C. and 800° C.

Preferably the heating in step (b) is preceded by gradually heating the catalyst material to the desired temperature. For example, the catalyst material may be placed in an oven at room temperature or at a temperature of at most 150° C. preferably at most 120° C., after which the oven and the catalyst material are (further) heated. After the heating in step (b), cooling of the catalyst material is preferably performed gradually, for example by switching off the oven with the catalyst material still in the oven. Obviously, when heating the catalyst material, which has been applied to a substrate, also the substrate will become heated.

It is to be noted that a low, possibly significantly lower than prior art, temperature for the fixing of step (b) can be used, as the catalyst material does not necessarily need the structural strength to support itself; it can have at least some structural strength provided by the substrate. This is in contrast to the usually desired higher temperature used when creating catalyst material. A lowering of this temperature naturally reduces the energy input required, reduces the complexity of equipment required to effect creation of the catalyst, and reduces or avoids sintering and undesired chemical reactions.

Substrates for supporting a catalyst material can be one or more of a number of materials, which are known in the art. These include metals such as steel, preferably stainless steel. Others include ceramics and combinations thereof.

The substrate may be in any suitable shape, form or design, e.g. foil or wire, or a more structured packing such as a gauze, honeycomb, monolith, sponge, foil construct or woven mat.

Preferably, if an adhesion layer is applied, the adhesion layer is heated, for example to a temperature in the range of 250 to 800° C., then the substrate and the adhesion layer are cooled or are allowed to cool down, and in a next step the catalyst material is applied.

Preferably, any adhesion layer used has a thickness of a few microns, for example 1-10 μm, preferably 2-5 μm, more preferably 3-4 μm. Meanwhile, the catalyst material layer may have a thickness which can be 5-200 microns, preferably 10-100 microns, more preferably 20-80 microns.

One advantage of the present invention is that it has now been found that a relatively thick layer of carrier or catalyst material can be applied on the substrate. It was noted that especially a substrate comprising a relatively thick layer of catalyst material, e.g. having a total thickness of more than 20 microns, especially more than 30 microns, should show sufficient adhesion between the catalyst layer and the substrate after heating step (b). This may be achieved with additives in the catalyst material applied to the substrate. For example, the catalyst material of step (a) may comprise a titanate compound, for example an ammonium salt of lactic acid titanate chelate, such as Tyzor® obtainable from DuPont. Additionally or alternatively, sufficient adhesion may be achieved using an adhesion layer as described above, or an adhesion layer plus a primer (see below), between the substrate and the catalyst material.

Sufficient adhesion is achieved when the layer has a less than 25%, preferably less than 20%, loss of catalyst material following the Adhesion Test described herein.

The Adhesion Test corresponds to the ASTM test method number B533-85 (2004). This is a standard test method for peel strength of metal electro-plated plastics, but is equally useable in the present situation.

In the present invention, the distribution and/or size of the cracks can be determined by one or more of the following factors selected from the group comprising: regime of the heating of the catalyst material in step (b), amount and composition of the catalyst material and optionally any adhesion layer, amount and/or composition of the atmosphere in which the heating of step (b) is carried out; composition of the substrate, thickness of the catalyst material layer.

For example, when in step (a) the catalyst material that is being applied to the substrate comprises a small amount of solvent, for example a small amount of water, a catalyst material layer will be obtained with more cracking then when less solvent is used. Preferably the catalyst material applied in step (a) comprises 10 to 40 weight % solids and 60 to 90 weight % solvent, preferably 60 to 90 weight % water, calculated on the total weight of catalyst material applied in step (a).

Preferably, the resultant particles or pieces, commonly termed 'domains' formed by the cracks in the catalyst material layer have an average domain size of 10-3000 microns, and preferably extend from one side of the layer to the other.

However the thickness of the layer will affect the size of the domains—typically the thicker the layer, the larger the domains. The cracking pattern may be 5 to 50 times the thickness of the layer.

By creating a relatively homogeneous domain size range, or, in the equivalent, a relatively homogeneous crack size (length or dimension) range, compensation for the difference between the thermal expansion of the catalyst material layer and the thermal expansion of the substrate, when in use, can be accommodated. The hitherto uncontrolled nature of any cracking in the catalyst material layer has not allowed the different thermal expansions to be accommodated.

Naturally, cracking of the catalyst material layer does not create perfect geometric or regular domain shapes. Hence, the "size" of domains is generally considered to be their average diameter, or a maximum straight internal length. In the same way, the "size" of a crack is generally considered to be its average width along a reasonable length of the crack between any crack intersections.

In one embodiment of the present invention, the range of the relative sizes of the domains is approximately 1:5. That is, the biggest size domains are wholly or substantially not greater than five times the size of the smallest size domains.

In another embodiment of the present invention, the sizes of the domains of the catalyst material layer formed by the cracks is within 80%, preferably 90%, preferably 95% or more, of one standard deviation from the mean domain size.

Thus, when the catalyst material is in use, i.e. undergoing a raised temperature in a reactor, the expansion of the domains is such that their change in size, both due to their own thermal expansion and the thermal expansion of the substrate on which they are supported, is less than the dimensions of the cracks. Hence the greater thermal expansion of the substrate does not result in reduction of adhesion of the catalyst material to the substrate, and hence the disassociation of the catalyst material from the substrate as discussed above. There is no catastrophic failure of the catalyst material layer. The surface tension caused by the thermal expansion of the catalyst layer has been accommodated.

For certain embodiments a primer can be provided between the adhesive and the substrate. The primer may be silica. Any primer may be applied using a coating technique, for example by means of dip-coating, painting, or spray-coating. There may be some differential thermal expansion between the primer and the catalyst material. Preferably the primer also exhibits controlled cracking as herein described. Typically the degree of controlled cracking experienced by the primer will be less than that of the catalyst material since the difference in thermal expansion between the catalyst material and primer is less than the difference in thermal expansion between a typically metal substrate and the catalyst material.

The present invention extends to a hydrocarbon synthesis catalyst material layer on a substrate whenever prepared by a method as hereinbefore defined.

The present invention further extends to a catalyst comprising a catalyst material on a support prepared by a method as hereinbefore defined, especially a catalyst suitable in hydrogenation reactions, such as hydrogenation of hydrocarbons, e.g. hydrocracking, and hydrogenation of carbon monoxide, e.g. Fischer-Tropsch.

The catalyst material layer can have a uniform distribution of cracks having sub-millimeter widths. It may also have the catalyst material layer has a uniform distribution of cracks, and has a less than 25%, preferably less than 20%, loss of catalyst material following the Adhesion Test herein defined.

Additionally, the catalyst material layer may be a hydrocarbon synthesis catalyst material layer on a substrate wherein the average crack width in the cracked catalyst material layer is greater than the average change in length of the particles formed by the cracks in the cracked catalyst material layer.

The control of cracking of the catalyst material on the substrate, especially the presence of cracks at regular distances such that there is no continuous catalyst layer on the substrate surface, reduces any stress build-up.

Preferably, the distance between the cracks is sufficiently well-controlled in relation to the type and thickness of the catalyst layer and type of substrate used as support, that said distance has a minimum standard deviation, and a maximum regularity. The regular cracking of the catalyst material layer also leads to increased regularity of hydrocarbon synthesis because of the increased surface area of the catalyst material layer created by the cracks. This allows increased access to catalyst material through or along the cracks, rather than totally relying on surface-migration of reactants to the interior catalyst material.

In the present invention, the sizes of the cracks in the formed catalyst material layer can be sufficiently controlled such that when the catalyst material layer is heated, i.e. put to use in a hydrocarbon synthesis reactor, said reactor typically having a temperature in the range from 100 to 600° C., generally from 150 to 350° C., and expectantly from 180 to 270° C., then the total area of the cracks is greater than the difference between the coefficient of thermal expansion of the substrate, usually a metal such as stainless steel, and the coefficient of thermal expansion of the formed catalyst material layer. Thus, as this difference in expansion manifests itself following use of a raised temperature in the reactor, the cracks accommodate the usually problematic difference in the different thermal expansions mentioned, and so avoids the usual breaking of the fixing or adhesion between the substrate and the catalyst material layer. This avoidance reduces the usual attrition of catalyst from the substrate, and so significantly increases the lifetime of the catalyst material in such a reactor.

The cracks in the formed catalyst material layer preferably extend wholly or substantially through the catalyst layer, preferably completely through the catalyst layer. The cracks are also preferably relatively 'straight walled' through the catalyst material, i.e. not significantly stepped.

The hydrocarbon synthesis process referred to in the present invention is particularly, but not exclusively, a Fischer-Tropsch reaction. Fischer-Tropsch catalysts are known in the art, and as a Group VIII metal component, they preferably use cobalt, iron and/or ruthenium, more preferably cobalt.

References to the Periodic Table and Groups thereof used herein refer to the previous IUPAC version of the Periodic Table of Elements such as that described in the 68th Edition of the Handbook of Chemistry and Physics (CPC Press).

The Group VIII catalytically active metal could be present with one or more metals or metal oxides as promoters, more particularly one or more d-metals or d-metal oxides.

Suitable metal oxide promoters may be selected from Groups IIA, IIIB, IVB, VB, VIB, VIIB, VIII of the Periodic Table of Elements, or the actinides and lanthanides. In particular, oxides of magnesium, calcium, strontium, barium, scandium, yttrium, lanthanum, cerium, titanium, zirconium, hafnium, thorium, uranium, vanadium, chromium and manganese are most suitable promoters.

Suitable metal promoters may be selected from Groups VIIB or VIII of the (same) Periodic Table. Manganese, iron and rhenium and Group VIII noble metals are particularly suitable, with platinum and palladium being especially preferred. The amount of promoter present in the catalyst is suitably in the range of from 0.001 to 100 pbw, preferably 0.05 to 20, more preferably 0.1 to 15 pbw, per 100 pbw of carrier.

Suitable co-catalysts include one or more noble metals from Group VIII. Preferred noble metals are platinum, palladium, rhodium, ruthenium, iridium and osmium. Most preferred co-catalysts for use in the hydro-cracking are those comprising platinum.

A most suitable catalyst comprises cobalt as the catalytically active metal and zirconium as a promoter. Another most suitable catalyst comprises cobalt as the catalytically active metal and manganese and/or vanadium as a promoter.

Any promoter(s) are typically present in an amount of from 0.1 to 60 parts by weight per 100 parts by weight of a carrier material. It will however be appreciated that the optimum amount of promoter(s) may vary for the respective elements which act as promoter(s). If the catalyst comprises cobalt as the catalytically active metal and manganese and/or vanadium as promoter, the cobalt:(manganese+vanadium) atomic ratio is advantageously at least 12:1.

The catalytically active metal is preferably supported on a porous carrier. The porous carrier may be selected from any of the suitable refractory metal oxides or silicates or combinations thereof known in the art. Particular examples of preferred porous carriers include silica, alumina, titania, zirconia, ceria and mixtures thereof, especially silica and titania. Such compounds, as well as other known organic compounds, could act as the 'glue' for creating the adhesion between the catalyst layer and the substrate.

The optimum amount of catalytically active metal present on a carrier depends inter alia on the specific catalytically active metal. Typically, the amount of cobalt present in the catalyst may range from 1 to 100 parts by weight per 100 parts by weight of carrier material, preferably from 5 to 50 parts by weight per 100 parts by weight of carrier material.

The carrier and catalytically active metal or precursor therefor could be admixed in any form or way known, and then applied to the substrate and optionally dried, prior to being calcined.

Typically a solvent or liquid is added to the mixture. Preferably the solvent or liquid is added to the mixture after admixing and before application to the substrate.

The solvent or liquid may be any of suitable liquids known in the art, for example: water; ammonia, alcohols, such as methanol, ethanol and propanol; ketones, such as acetone; aldehydes, such as propanol and aromatic solvents, such as toluene, and mixtures of the aforesaid liquids. A most convenient and preferred liquid is water.

The solvent or liquid may include viscosity improvers such as polyvinylalcohol. The mixture of carrier and catalytically active metal or precursor therefor may comprise one or more thixotropic agents. Especially when a slurry is prepared, the mixture may comprise one or more dispersion aids. A suitable dispersant is, for example, a titanate compound, preferably an organic titanate salt, more preferably a salt of lactic acid titanate chelate, most preferably an ammonium salt of lactic acid titanate chelate. An ammonium salt of lactic acid titanate chelate may be obtained from DuPont (Tyzor®).

The catalytically active metal or precursor therefor and the promoter(s)/co-catalyst(s) or precursor(s) therefor, may be deposited on a carrier material by a suitable treatment, such as kneading, or impregnation after the carrier has been applied to the substrate. When the catalytically active metal or precursor therefor and the promoter(s)/co-catalyst(s) or precursor(s) therefor are deposited on a carrier material by impregnation, this is preferably performed after application and heating, and hence cracking, of the carrier material. Most preferably the catalytically active metal or precursor therefor and the promoter(s)/co-catalyst(s) or precursor(s) therefor are mixed with the carrier material before application to the substrate.

After deposition of the catalytically active metal and the promoter on the carrier material, the loaded carrier is typically subjected to calcinations at a temperature of generally from 250 to 750° C., preferably a temperature in the range of from 270 to 550° C. The effect of the calcinations treatment is to remove chemically or physically bonded water such as crystal water, to decompose volatile decomposition products and to convert organic and inorganic compounds to their respective oxides. After calcinations, the resulting catalyst or catalyst precursor may be activated by contacting it with hydrogen or a hydrogen-containing gas, typically at temperatures of about 200 to 350° C.

A steady state catalytic hydrocarbon synthesis process may be performed under conventional synthesis conditions known in the art. Typically, the catalytic conversion may be effected at a temperature in the range of from 100 to 600° C., preferably from 150 to 350° C., more preferably from 180 to 270° C. Typical total pressures for the catalytic conversion process are in the range of from 1 to 200 bar absolute, more preferably from 10 to 70 bar absolute. In the catalytic conversion process mainly (at least 70 wt %, preferably 90 wt %) of $C_5+$ hydrocarbons are formed, based on the total weight of hydrocarbonaceous products formed.

The present invention also provides a process for the production of normally liquid and optionally normally solid hydrocarbons from a light hydrocarbonaceous feed gas stream, comprising the steps of:
(i) using the feed gas stream to provide synthesis gas; and
(ii) converting the synthesis gas of step (i) at an elevated temperature and pressure using a catalyst material layer as herein defined to obtain the normally gaseous, normally liquid and optionally nominally solid hydrocarbons, optionally further comprising:
(iii) catalytically hydrocracking higher boiling range paraffinic hydrocarbons produced in step (ii),
as well as hydrocarbons whenever provided by a process as described herein.

The present invention also provides use of a catalyst as defined herein in a process for producing normally gaseous, normally liquid and optionally normally solid hydrocarbons from synthesis gas which comprises the steps of:
(i) providing the synthesis gas; and
(ii) catalytically converting the synthesis gas of step (i) at an elevated temperature and pressure to obtain the normally gaseous, normally liquid and optionally normally solid hydrocarbons. The term "normally" relates to STP-conditions, i.e. 0° C. and 1 bar.

Fischer-Tropsch synthesis is preferably carried out at a temperature in the range from 125 to 350° C., more preferably 175 to 275° C., most preferably 200 to 260° C. The pressure preferably ranges from 5 to 150 bar abs., more preferably from 5 to 80 bar abs.

Preferably, a Fischer-Tropsch catalyst is used, which yields substantial quantities of paraffins, more preferably substantially unbranched paraffins. A part may boil above the boiling point range of the so-called middle distillates, to normally solid hydrocarbons. A most suitable catalyst for this purpose is a cobalt-containing Fischer-Tropsch catalyst. The term "middle distillates", as used herein, is a reference to hydrocarbon mixtures of which the boiling point range corresponds substantially to that of kerosene and gas oil fractions obtained in a conventional atmospheric distillation of crude mineral oil. The boiling point range of middle distillates generally lies within the range of about 150 to about 360° C.

The higher boiling range paraffinic hydrocarbons if present, may be isolated and subjected to a catalytic hydrocracking step, which is known per se in the art, to yield the desired middle distillates. The catalytic hydrocracking is carried out by contacting the paraffinic hydrocarbons at elevated temperature and pressure and in the presence of hydrogen with a catalyst containing one or more metals having hydrogenation activity, and supported on a carrier. Suitable hydrocracking catalysts include catalysts comprising metals selected from Groups VIB and VIII of the (same) Periodic Table of Elements. Preferably, the hydrocracking catalysts contain one or more noble metals from Group VIII. Preferred noble metals are platinum, palladium, rhodium, ruthenium, iridium, and osmium. Most preferred catalysts for use in the hydrocracking stage are those comprising platinum.

The amount of catalytically active metal present in the hydrocracking catalyst may vary within wide limits and is typically in the range of from about 0.05 to about 5 parts by weight per 100 parts by weight of the carrier material. Suitable conditions for the catalytic hydrocracking are known in the art. Typically, the hydrocracking is effected at a temperature in the range of from about 175 to 400° C. Typical hydrogen partial pressures applied in the hydrocracking process are in the range of from 10 to 250 bar.

The process may be operated in a single pass mode ("once through") or in a recycle mode. Slurry bed reactors, ebullating bed reactors and fixed bed reactors may be used, the fixed bed reactor being the preferred option.

The product of the hydrocarbon synthesis and consequent hydrocracking suitably comprises mainly normally liquid hydrocarbons, beside water and normally gaseous hydrocarbons. By selecting the catalyst and the process conditions in such a way that especially normally liquid hydrocarbons are obtained, the product obtained ("syncrude") may transported in the liquid form or be mixed with any stream of crude oil without creating any problems as to solidification and or crystallization of the mixture. It is observed in this respect that the production of heavy hydrocarbons, comprising large amounts of solid wax, are less suitable for mixing with crude oil while transport in the liquid form has to be done at elevated temperatures, which is less desired. The off gas of the hydrocarbon synthesis may comprise normally gaseous hydrocarbons produced in the synthesis process, nitrogen, unconverted methane and other feedstock hydrocarbons, unconverted carbon monoxide, carbon dioxide, hydrogen and water. The normally gaseous hydrocarbons are suitably $C_{1-5}$ hydrocarbons, preferably $C_{1-4}$ hydrocarbons, more preferably $C_{1-3}$ hydrocarbons. These hydrocarbons, or mixtures thereof, are gaseous at temperatures of 5-30° C. (1 bar), especially at 20° C. (1 bar). Further, oxygenated compounds, e.g. methanol, dimethyl ether, may be present in the off gas. The off gas may be utilized for the production of electrical power, in an expanding/combustion process such as in a gas turbine described herein, or recycled to the process. The energy generated in the process may be used for own use or for export to local customers. Part of an energy could be used for the compression of the oxygen containing gas.

The process as just described may be combined with all possible embodiments as described in this specification.

Steam generated by any start-up gas turbine and/or steam generated in step (i) may also be used to preheat the reactor to be used in step (ii) and/or may be used to create fluidization in the case that a fluidized bed reactor or slurry bubble column is used in step (ii).

Any percentage mentioned in this description is calculated on total weight or volume of the composition, unless indicated differently. When not mentioned, percentages are considered to be weight percentages. Pressures are indicated in bar absolute, unless indicated differently.

EXAMPLES

Figure 2:
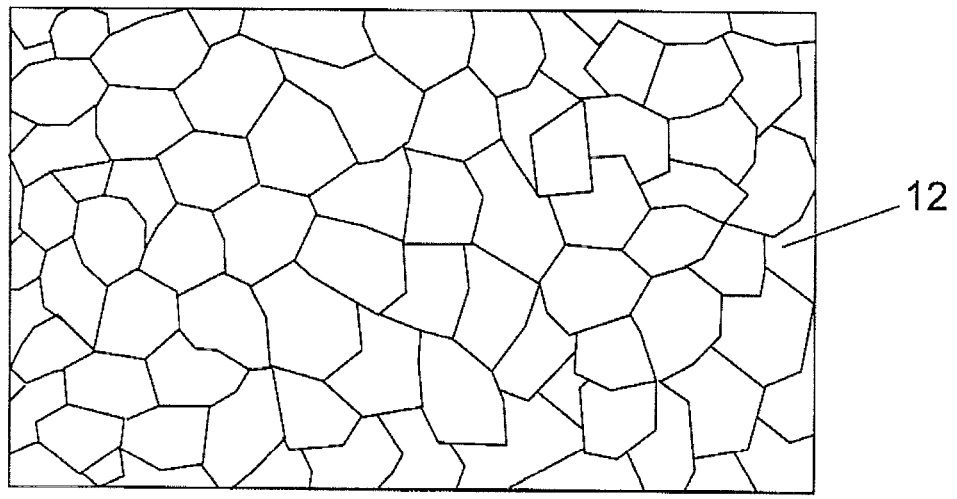
FIG. 2 is a plan schematic view of a catalyst material layer on a substrate according to one embodiment of the present invention.
Figure 3:
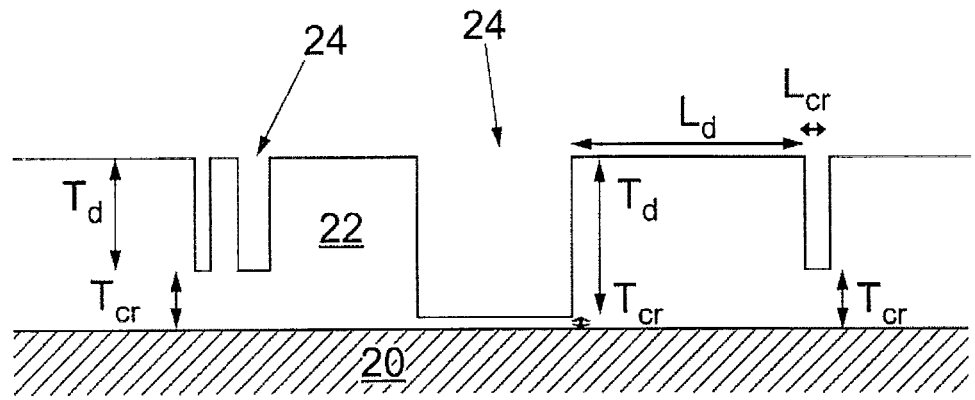
FIG. 3 is a schematic cross sectional view of FIG. 1.

Embodiments of the present invention will now be described by way of example only and with reference to the accompanying diagrammatic drawings in which:

FIG. 1 is a plan schematic view of a prior art catalyst material layer on a substrate;

FIG. 2 is a plan schematic view of a catalyst material layer on a substrate according to one embodiment of the present invention;

FIG. 3 is a schematic cross sectional view of FIG. 1; and

Figure 4:
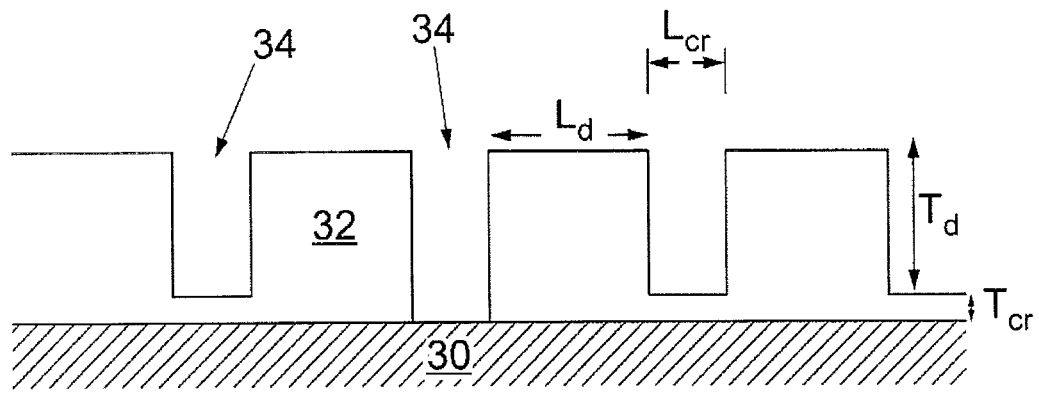
FIG. 4 is a schematic cross sectional view of part of the layer in FIG. 2.

FIG. 4 is a schematic cross sectional view of part of the layer in FIG. 2.

FIG. 1 shows a typical prior art catalyst material layer 10 having 'uncontrolled' cracking. After the catalyst material layer has been fixed to the substrate (thereunder), the required heating of the catalyst layer has resulted in its cracking to create domains which are either very big or very small. Those that are very small will have insufficient adhesion to the substrate when the catalyst layer is used in a reactor, i.e. subjected to high temperatures and pressures and possibly agitation partly caused by flowing gas and liquid streams. These small domains will therefore easily disassociate themselves from the substrate, and become mixed with the reactants and products formed, and require filtering away. Meanwhile, the very large domains in the layer may still be too large to accommodate the difference in thermal expansion of the substrate and the catalyst layer, and so again become weakened and possibly disassociated from the substrate layer.

This is also exemplified in FIG. 3 which is a cross sectional view a sample part of FIG. 1. It shows the metal substrate 20 having a catalyst layer thereon. The catalyst layer has the different shaped domains 22, created by cracks 24. The non-regularity of the cracks and domains means that upon expansion of the domains 22 in use, their expansion cannot in certain places be accommodated by some of the cracks 24, leading to tension and usually some reduction in adhesion to the metal substrate 20, and so loss of catalyst material from the substrate 20.

FIG. 2 shows an example of the present invention, wherein the heating of the catalyst material is characterized in that cracks are formed in 'controlled' manner uniformly across the layer 12. The uniform or relatively homogeneous distribution of the cracks therefore provides relatively homogeneous domain sizes, having a controlled or limited range.

FIG. 4 shows a cross sectional view of a sample part of the catalyst layer in FIG. 2. On the substrate 30, more regular cracks 34 have formed a more regular or homogeneous range of domain sizes 32.

Using the domain size as "Ld", and the crack size as "Lcr", then the benefit of the present invention is that Lcr is less than the change in Ld when the catalyst layer is in use, i.e. subjected to an increase in temperature (possibly in combination with one or more other process conditions) which changes the dimensions of the domains 32. Hence, there will be less disassociation of the catalyst layer domains 32 in use, less attrition, and therefore an increased amount of catalyst material continuing to be available in the reactor over time.

The thickness of the catalyst layer Td is substantially larger than the thickness of eventual catalyst layer in the cracks Tcr. In FIG. 4 the thickness Td is 20-30 μm. The layer thickness in the cracks can be from zero up to 10% of the thickness of the catalyst layer. Moreover the thickness of the layer in the cracks is more constant in thickness in the invention (FIG. 4), compared to the prior art catalyst (FIG. 3). Also shown in FIG. 3, for the prior art, Tcr can be much thicker in small cracks compared to larger cracks, which also makes the catalyst layer prone to attrition losses.

In another example a sample according to the present invention was prepared as follows.

Titania (P25 ex Degusta), cobalt hydroxide and water were mixed in a ratio of about 3:1.5:1. In a next step a slurry was prepared from this mixture by adding extra water, a manganese compound, dispersion aids, and a thixotropic agent. A stainless steel substrate was dip-coated into the slurry and calcined at 550° C., then the coated substrate was again dip-coated into the slurry and calcined at 550° C. The resulting coating on the substrate had a thickness of 31 micrometer, adhered well to the substrate, and showed cracks with a relatively homogeneous distribution and relatively homogeneous domain sizes.

What is claimed is:

1. A method of supporting a hydrocarbon synthesis catalyst material comprising a catalytically active metal and a carrier material on a substrate comprising the steps of:
   (a) applying the catalyst material to the substrate; and
   (b) heating the catalyst material to form a catalyst material layer fixed to the substrate,
   wherein
      the substrate is a metal substrate and comprises:
         an adhesion layer with a thickness of 1-10 μm, said adhesion layer is selected from the group consisting of titania, alumina, silica and zirconia, and
         a primer between the adhesion layer and the substrate;
      the catalyst carrier is titania or a precursor therefore;
      the catalyst material applied in step (a) comprises 60 to 90 weight % solvent calculated on the total weight of the catalyst material layer;
      when the catalyst material is subjected to the heating step (b) it comprises at most 10 weight % of solvent, calculated on the total weight of the catalyst material layer;
      in heating step (b) the catalyst material is heated to a temperature in the range between 250° C. and 800° C.;
      cracks having sub-millimeter widths are formed in the catalyst material layer creating domains with the range of the relative sizes of the domains being approximately 1:5;
      after step (b) the catalyst material layer has a thickness of 20-80 microns.

2. A method according to claim 1, wherein the catalyst material layer has a less than 25%, loss of catalyst material following the ASTM test method number B533-85 (2004).

3. A method according to claim 1, wherein the substrate is steel.

4. A method according to claim 1, wherein the thickness of the substrate is between 5 and 100 micron.

5. A method according to claim 1, wherein the primer comprises silica.

6. A method according to claim 1, wherein the adhesion layer comprises titania.

7. A method according to claim 1, wherein in heating step (b) the catalyst material is heated to a temperature in the range between 250° C. and 600° C.

8. A hydrocarbon synthesis catalyst material layer on a substrate prepared by a method as defined in claim 1.

9. A method of supporting a hydrocarbon synthesis catalyst material comprising a catalytically active metal and a carrier material on a substrate comprising the steps of:
   (a) applying the catalyst material to the substrate; and
   (b) heating the catalyst material to form a catalyst material layer fixed to the substrate, wherein
      the substrate is a metal substrate and comprises:
         an adhesion layer with a thickness of 1-10 μm, said adhesion layer is selected from the group consisting of titania, alumina, silica and zirconia, and
         a primer between the adhesion layer and the substrate;
      the catalyst carrier is titania or a precursor therefore;
      the catalyst material applied in step (a) comprises 60 to 90 weight % solvent calculated on the total weight of the catalyst material layer;
      when the catalyst material is subjected to the heating step (b) it comprises at most 10 weight % of solvent, calculated on the total weight of the catalyst material layer;
      in heating step (b) the catalyst material is heated to a temperature in the range between 250° C. and 800° C.;
      cracks having sub-millimeter widths are formed in the catalyst material layer creating domains with the sizes of the domains of the catalyst material layer formed by the cracks being within 80% of one standard deviation from the mean domain size;
      after step (b) the catalyst material layer has a thickness of 20-80 microns.

10. A method according to claim 9, wherein the catalyst material layer has a less than 25% loss of catalyst material following the ASTM test method number B533-85 (2004).

11. A method according to claim 9, wherein the substrate is steel.

12. A method according to claim 9, wherein the thickness of the substrate is between 5 and 100 micron.

13. A method according to claim 9, wherein the primer comprises silica.

14. A method according to claim 9, wherein the adhesion layer comprises titania.

15. A method according to claim 9, wherein in heating step (b) the catalyst material is heated to a temperature in the range between 250° C. and 600° C.

16. A hydrocarbon synthesis catalyst material layer on a substrate prepared by a method as defined in claim 9.

* * * * *